(12) United States Patent
Lim et al.

(10) Patent No.: US 11,349,182 B2
(45) Date of Patent: May 31, 2022

(54) ELECTRODE ASSEMBLY

(71) Applicant: LG Chem, Ltd., Seoul (KR)

(72) Inventors: Hae Jin Lim, Daejeon (KR); Sang Uck Kim, Daejeon (KR)

(73) Assignee: LG Energy Solution, Ltd.

( * ) Notice: Subject to any disclaimer, the term of this patent is extended or adjusted under 35 U.S.C. 154(b) by 118 days.

(21) Appl. No.: 16/478,660

(22) PCT Filed: Apr. 13, 2018

(86) PCT No.: PCT/KR2018/004367
§ 371 (c)(1),
(2) Date: Jul. 17, 2019

(87) PCT Pub. No.: WO2018/190692
PCT Pub. Date: Oct. 18, 2018

(65) Prior Publication Data
US 2019/0379028 A1     Dec. 12, 2019

(30) Foreign Application Priority Data

Apr. 14, 2017 (KR) ........................ 10-2017-0048647

(51) Int. Cl.
*H01M 50/531* (2021.01)
*H01M 50/50* (2021.01)
*H01M 10/0587* (2010.01)

(52) U.S. Cl.
CPC ..... *H01M 50/531* (2021.01); *H01M 10/0587* (2013.01)

(58) Field of Classification Search
CPC ...... H01M 50/10; H01M 50/538; H01M 2/26; H01M 10/0587
See application file for complete search history.

(56) References Cited

U.S. PATENT DOCUMENTS

2005/0221178 A1    10/2005 Kim
2007/0269685 A1*   11/2007 Chu ................. H01M 10/0431
                                                        429/3

(Continued)

FOREIGN PATENT DOCUMENTS

CN        1684291 A      10/2005
CN      101841059 A       9/2010

(Continued)

OTHER PUBLICATIONS

Extended European Search Report including Written Opinion for Application No. EP18784470.9 dated Jan. 24, 2020.

(Continued)

*Primary Examiner* — Kenneth J Douyette
(74) *Attorney, Agent, or Firm* — Lerner, David, Littenberg, Krumholz & Mentlik, LLP (57) ABSTRACT

The present invention relates to an electrode assembly in which resistance is capable of being reduced. Also, an electrode assembly having a wound position and an unwound position includes an electrode having an electrode collector, the electrode collector having a coating portion coated with an active material and a non-coating portion on which the active material is not applied, when the electrode assembly is in the unwound position, the coating portion and the non-coating portion are adjacent to one another in a longitudinal direction of the electrode collector, one or more tab members extending from the non-coating portion, and one or more foil tabs extending from the coating portion in a width direction of the electrode collector perpendicular to the longitudinal direction, the active material not being applied to the foil tabs.

7 Claims, 6 Drawing Sheets

(56) References Cited

U.S. PATENT DOCUMENTS

| | | | |
|---|---|---|---|
| 2010/0190056 A1 | 7/2010 | Turner et al. | |
| 2011/0067227 A1 | 3/2011 | Sohn | |
| 2011/0081574 A1 | 4/2011 | Jo et al. | |
| 2011/0262779 A1* | 10/2011 | Maleki | H01M 50/116 429/10 |
| 2012/0009450 A1 | 1/2012 | Chun | |
| 2013/0252054 A1* | 9/2013 | Barone | H01M 10/0431 429/94 |
| 2014/0147714 A1 | 5/2014 | Kwak et al. | |
| 2015/0037638 A1 | 2/2015 | Kim et al. | |
| 2016/0218343 A1* | 7/2016 | Kim | H01M 10/0409 |
| 2016/0351940 A1 | 12/2016 | Guen | |

FOREIGN PATENT DOCUMENTS

| | | |
|---|---|---|
| CN | 102484240 A | 5/2012 |
| CN | 202695607 U | 1/2013 |
| CN | 204577523 U | 8/2015 |
| JP | H0935701 A | 2/1997 |
| JP | 2000106167 A | 4/2000 |
| JP | 2001110453 A | 4/2001 |
| JP | 2010080392 A | 4/2010 |
| JP | 2011065981 A | 3/2011 |
| JP | 2011081964 A | 4/2011 |
| JP | 2012190739 A | 10/2012 |
| KR | 20110031063 A | 3/2011 |
| KR | 20110036499 A | 4/2011 |
| KR | 20110118797 A | 11/2011 |
| KR | 20120006389 A | 1/2012 |
| KR | 20120062254 A | 6/2012 |
| KR | 20160101347 A | 8/2016 |
| KR | 101678537 B1 | 11/2016 |
| KR | 20160138782 A | 12/2016 |
| WO | 2017047353 A1 | 3/2017 |

OTHER PUBLICATIONS

International Search Report for Application No. KR2018/004367 dated Jul. 17, 2018, pp. 1-2.
Search Report for Chinese Application No. 201880007301.3 dated Oct. 26, 2021. 3 pgs.

* cited by examiner

ELECTRODE ASSEMBLY

CROSS-REFERENCE TO RELATED APPLICATION

The present application is a national phase entry under 35 U.S.C. § 371 of International Patent Application No. PCT/KR2018/004367, filed on Apr. 13, 2018, published in Korean, which claims priority from Korean Patent Application No. 10-2017-0048647, filed on Apr. 14, 2017, the disclosures of which are hereby incorporated herein by reference in their entireties.

TECHNICAL FIELD

The present invention relates to an electrode assembly, and more particularly, to an electrode assembly in which resistance is capable of being reduced.

BACKGROUND ART

Batteries (cells) that generate electric energy through physical or chemical reaction to supply the generated electric energy to the outside are used when AC power to be supplied to the building is not obtained, or DC power is required according to the living environments surrounded by various electric and electronic devices.

Among such batteries, primary batteries and secondary batteries, which are chemical batteries using chemical reaction, are being generally used. The primary batteries are consumable batteries which are collectively referred to as dry batteries. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such the charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

An electrode assembly and a secondary battery including the same according to the related art is disclosed in Korea Patent Publication No. 10-2012-0006389.

The secondary battery according to the related art has a structure in which two positive electrode tabs and two negative electrode tabs are provided. This structure has a limitation in reducing resistance.

However, the need for development of low resistance secondary battery is increasing according to market changes such as development of electric vehicles, miniaturization and portablization of electric appliances, and the like.

DISCLOSURE OF THE INVENTION

Technical Problem

Accordingly, the present invention has been made in view of the above-described needs, an object of the present invention is to provide an electrode assembly in which a tab is added to an electrode pattern to minimize electrical resistance.

Technical Solution

An electrode assembly having a wound position and an unwound position according to an embodiment of the present invention includes an electrode having an electrode collector, the electrode collector having a coating portion coated with an active material and a non-coating portion on which the active material is not applied, when the electrode assembly is in the unwound position, the coating portion and the non-coating portion are adjacent to one another in a longitudinal direction of the electrode collector, one or more tab members each extending from the non-coating portion, and one or more foil tabs each extending from the coating portion in a width direction of the electrode collector perpendicular to the longitudinal direction, the active material not being applied to the foil tabs.

At least one of the foil tabs may be formed from the coating portion of the electrode collector.

The at least one of the foil tabs may include between one and ten foil tabs.

Each of the foil tabs may have a length of 5 mm to 16 mm.

Each of the foil tabs may have a width of 2 mm to 120 mm.

When the electrode assembly is in the wound position, lengths of the foil tabs gradually increase from a center of the electrode assembly toward an the outside of the electrode assembly.

The non-coating portion of the electrode collector may be disposed in two areas respectively located at first and second opposite ends of the electrode collector.

The tab members may include a first tab member extending from the non-coating portion at the first end of the electrode collector and a second tab member extending from the non-coating portion at the second end of the electrode collector.

Each of the foil tabs may be formed by notching or punching the electrode collector.

The electrode may be a negative electrode. The electrode may be a positive electrode.

Advantageous Effects

According to the present invention, the number of electrode tabs may be maximized to minimize the resistance.

According to the present invention, the plurality of electrode tabs may be wound with different lengths at the inside and the outside to smoothly come into electrical contact with the can member.

According to the present invention, since the plurality of electrode tabs extend from the coating portion of the electrode collector, the resistance may be reduced while maintaining the capacity.

BRIEF DESCRIPTION OF THE DRAWINGS

FIG. 1 is a developed view illustrating an electrode of an electrode assembly according to an embodiment of the present invention.

MODE FOR CARRYING OUT THE INVENTION

Hereinafter, an electrode assembly according to an exemplary embodiment of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

FIG. 1 is a developed view illustrating an electrode of an electrode assembly according to an embodiment of the present invention.

As illustrated in FIG. 1, when the wound electrode assembly is spread, an electrode assembly according to the present invention includes an electrode 100 provided with a coating portion 110 coated with an active material on an electrode collector and a non-coating portion 120, on which the active material "a" is not applied on the electrode collector, in a longitudinal direction of the electrode collector, a tab member 121 disposed on the non-coating portion 120, and a foil tab 111 which extends from the coating portion 110 in a width direction of the electrode collector and on which the active material "a" is not applied.

An electrode may be one of a positive electrode coated with a positive electrode active material and a negative electrode coated with a negative electrode active material. The electrode assembly may be manufactured by laminating the positive electrode, the negative electrode, and a separator several times so that the separator is disposed between the positive electrode and the negative electrode.

Also, the electrode assembly may be manufactured by winding the laminate, in which the positive electrode, the separator, and the negative electrode are laminated, in a jelly-roll shape.

The positive electrode may be an aluminum electrode collector and include a positive electrode coating portion coated with the positive electrode active material and a positive electrode non-coating portion which is not coated with the positive electrode active material.

The positive electrode active material may include a lithium-containing transition metal oxide such as $LiCoO_2$, $LiNiO_2$, $LiMnO_2$, and $LiMnO_4$ or a lithium chalcogenide compound.

The positive electrode coating portion may be manufactured, for example, by applying the positive electrode active material to a portion of at least one surface of the aluminum electrode collector, and the remaining portion of the aluminum electrode collector, which is not coated with the positive electrode active material, may be the positive electrode non-coating portion.

The negative electrode may be a copper electrode collector and include a negative electrode coating portion coated with the negative electrode active material and a negative electrode non-coating portion which is not coated with the negative electrode active material.

The negative electrode active material may be a carbon material such as crystalline carbon, amorphous carbon, a carbon composite, and a carbon fiber, a lithium metal, or a lithium alloy.

The negative electrode coating portion may be manufactured, for example, by applying the negative electrode active material to a portion of at least one surface of the copper electrode collector, and the remaining portion of the copper electrode collector, which is not coated with the negative electrode active material, may be the negative electrode non-coating portion.

The separator may be manufactured by applying a polyvinylidene fluoride-hexafluoropropylene copolymer (PVDF-HFP co-polymer) to one base material selected from the group consisting of, for example, polyethylene (PE), polystyrene (PS), polypropylene (PP), and a copolymer of polyethylene (PE) and polypropylene.

As described above, the electrode 100 according to the present invention may be one of the positive electrode and the negative electrode, which constitute the electrode assembly. Particularly, the electrode 100 may be one, which requires further reduction in resistance, of the positive electrode and the negative electrode.

The electrode 100 has both ends on which the non-coating portions 120 are respectively disposed. A tab member 121 may be attached to each of the non-coating portions 120 disposed on both the ends of the electrode 100.

Figure 2:
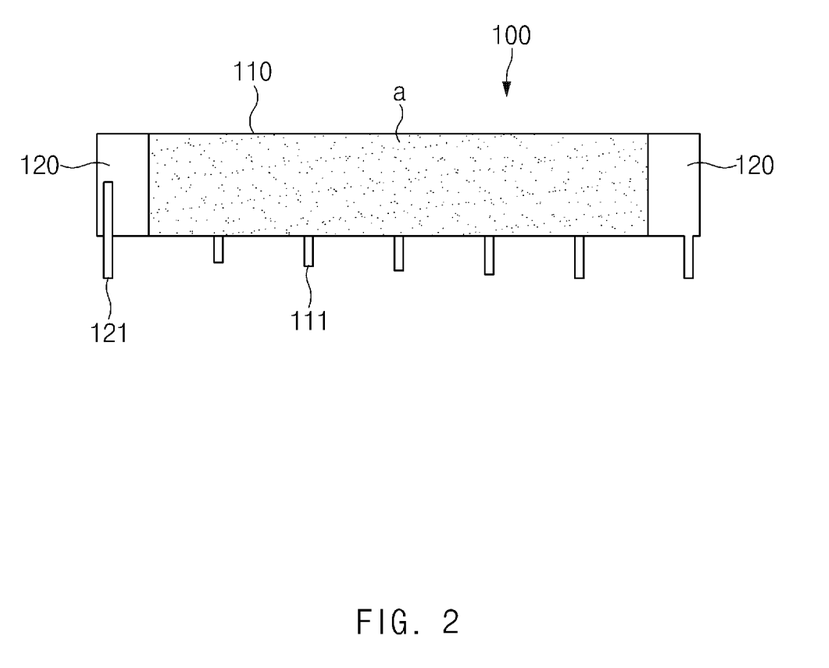
FIG. 2 is a developed view illustrating an electrode of an electrode assembly according to another embodiment of the present invention.
Figure 3:
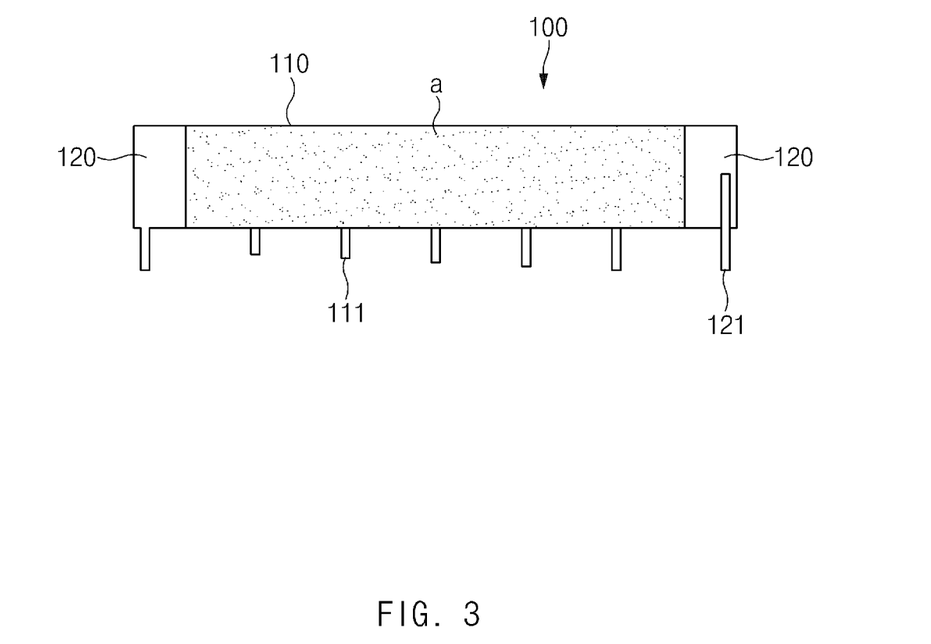
FIG. 3 is a developed view illustrating an electrode of an electrode assembly according to further another embodiment of the present invention.

FIG. 2 is a developed view illustrating an electrode of an electrode assembly according to another embodiment of the present invention, and FIG. 3 is a developed view illustrating an electrode of an electrode assembly according to further another embodiment of the present invention.

As illustrated in FIGS. 2 and 3, according to various embodiments of the present invention, when a non-coating portion 120 is disposed on each of both ends of an electrode 100, and a tab member 121 is attached to one non-coating portion 120 of both non-coating portions 120, the electrode collector may extend to form the tab member 121 on the other non-coating portion 120.

A foil tab 111 may be formed by notching or punching the electrode 100 to extend from a coating portion 110 of the electrode in a width direction. That is, the electrode 100 may be cut by using a knife, laser, and the like or pressed by using a press to form the foil tab 111.

Also, the foil tab 111 may be formed to extend to only the electrode collector on a coating portion of the electrode 100 and also may not be coated with an active material a.

Only the active material "a" may be removed from the coating portion 110 extending from the electrode 100 to form the foil tab 111. Alternatively, only the electrode collector may extend without applying the active material "a" on the area of the coating portion 110 of the electrode 100 to form the foil tab 111.

Also, one or more foil tabs 111 may extend from the coating portion 110 to maximize the number of electrode tabs. When the number of foil tabs 111 increases, each electrode tab may decrease in resistance.

The number of foil tabs 111 may preferably be between one and ten.

Each foil tab 111 may have a width of 2 mm to 120 mm to optimize a size of the foil tab 111 and minimize the resistance without affecting a size of the electrode.

Each foil tab 111 may preferably have a length of 5 mm to 16 mm. This is done because, if the length of the foil tab 111 is less than 5 mm, it is difficult to come into electrical contact with a can member, and if the length of the foil tab 111 exceeds 16 mm, the material cost is wasted due to the length longer than that required for the electrical contact with the can member, and a space in the can member is occupied too much.

Figure 4:
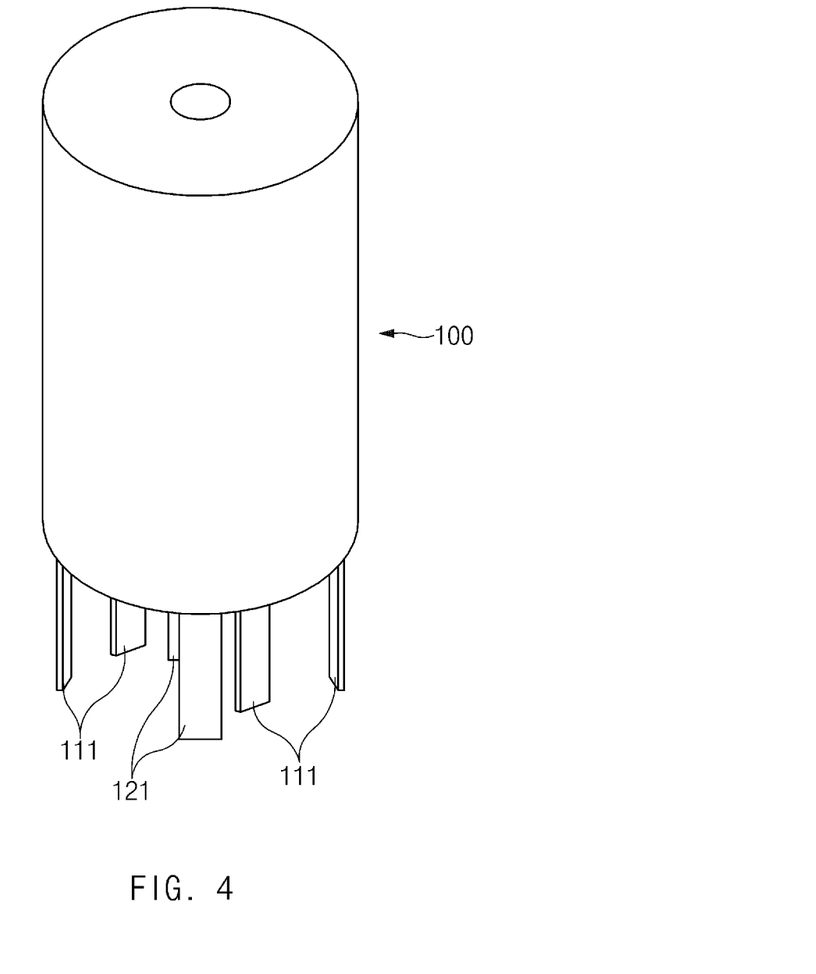
FIG. 4 is a perspective view illustrating a state in which the electrode assembly is wound according to an embodiment of the present invention.
Figure 5:
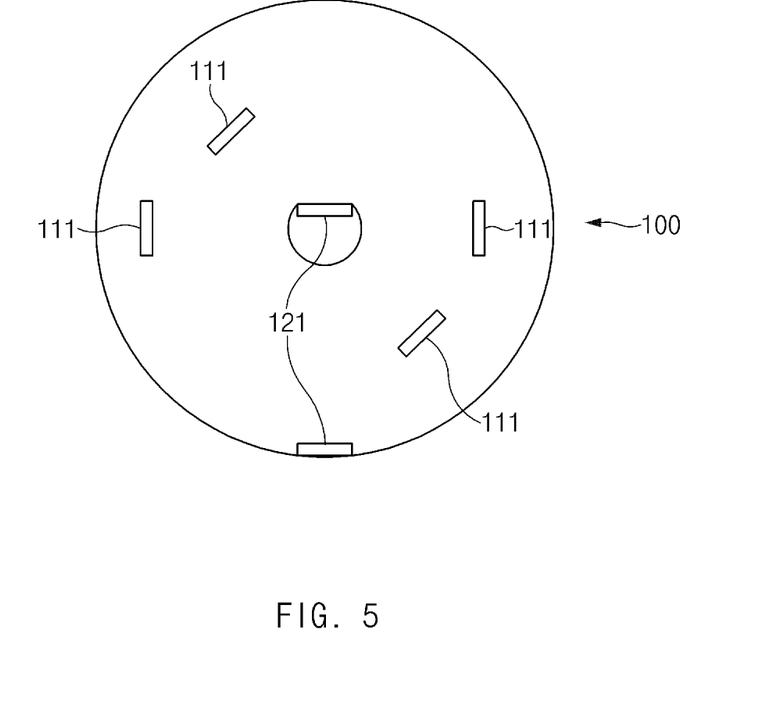
FIG. 5 is a bottom view of FIG. 4.
Figure 6:
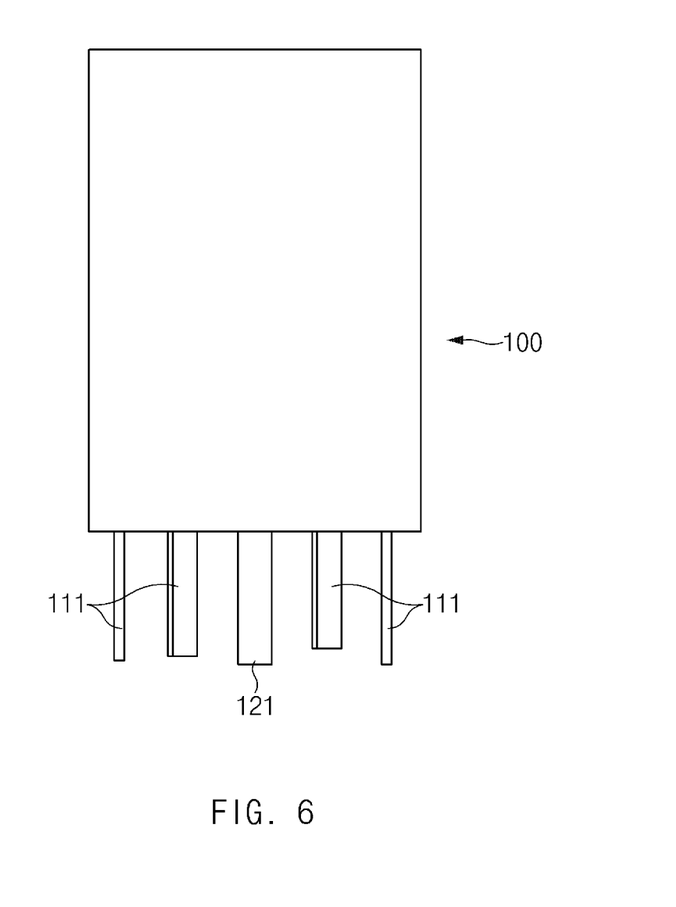
FIG. 6 is a side view of FIG. 4.

FIG. 4 is a perspective view illustrating a state in which the electrode assembly is wound according to an embodiment of the present invention, FIG. 5 is a bottom view of FIG. 4, and FIG. 6 is a side view of FIG. 4.

As illustrated in FIGS. 1 to 6, in the electrode assembly according to the present invention, when the electrode 100 is wound, the foil tab 111 may be provided in plurality on the wound electrode 100 so that the lengths of the foil tabs 111 gradually increase from a center of the electrode 100 toward the outside.

That is, in the state in which the negative electrode 100 is wound, the foil tabs 111 may be bent in a central direction of a bottom surface of the can member and electrically connected to the bottom surface of the can member. Thus, the foil tabs 111 may have lengths that gradually increase toward the outside of the wound electrode 100 to smoothly come into electrical contact with the can member.

As described above, according to the present invention, the number of electrode tabs may be maximized to minimize the resistance.

According to the present invention, the plurality of electrode tabs may be wound with different lengths at the inside and the outside to smoothly come into electrical contact with the can member.

According to the present invention, since the plurality of electrode tabs extend from the coating portion of the electrode collector, the resistance may be reduced while maintaining the capacity.

Although the electrode assembly according to the present invention has been described above with reference to the exemplary drawings, various changes and modifications may be made thereto by one skilled in the art without departing from the scope and spirit of the invention as set forth in the appended claims.

The invention claimed is:

1. An electrode assembly having a wound position and an unwound position, the electrode assembly comprising:
    an electrode having an electrode collector, the electrode collector having a coating portion coated with an active material and a non-coating portion on which the active material is not applied, when the electrode assembly is in the unwound position, the coating portion and the non-coating portion are adjacent to one another in a longitudinal direction of the electrode collector;
    first and second tab members each extending from the non-coating portion, the non-coating portion being disposed in two areas respectively located at first and second opposite ends of the electrode collector, the first tab member extending from the non-coating portion at the first end of the electrode collector and the second tab member extending from the non-coating portion at the second end of the electrode collector; and
    two or more foil tabs each extending from the coating portion in a width direction of the electrode collector perpendicular to the longitudinal direction, the active material not being applied to the foil tabs,
    wherein, when the electrode assembly is in the wound position, lengths of the foil tabs increase from a center of the electrode assembly toward an outside of the electrode assembly, the first and second tab members have a same length that is greater than or equal to each of the lengths of the foil tabs, and ones of the foil tabs that are closer to the first tab member than the second tab member are each shorter than the first tab member.

2. The electrode assembly of claim 1, wherein the two or more foil tabs includes between two and ten foil tabs.

3. The electrode assembly of claim 1, wherein each of the foil tabs has a length of 5 mm to 16 mm.

4. The electrode assembly of claim 1, wherein each of the foil tabs has a width of 2 mm to 120 mm.

5. The electrode assembly of claim 1, wherein each of the foil tabs is formed by notching or punching the electrode collector.

6. The electrode assembly of claim 1, wherein the electrode is a negative electrode.

7. The electrode assembly of claim 1, wherein the electrode is a positive electrode.

* * * * *